W. B. WOORE.
SECONDARY VALVE.
APPLICATION FILED SEPT. 18, 1920.
1,383,272.
Patented June 28, 1921.
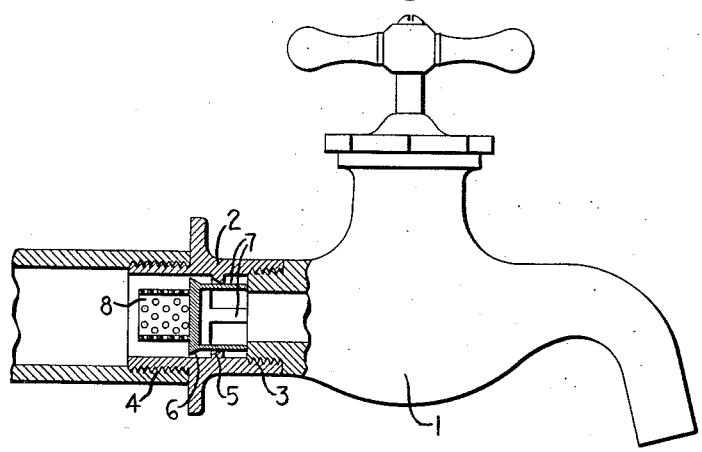
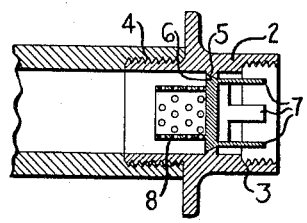
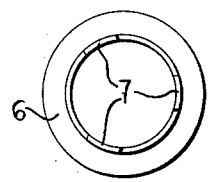
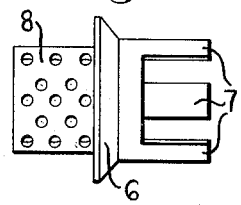
Inventor
WALTER B. WOORE
By his Attorney
Warren S. Orton.

UNITED STATES PATENT OFFICE.

WALTER B. WOORE, OF NEW YORK, N. Y.

SECONDARY VALVE.

1,383,272.  Specification of Letters Patent.  Patented June 28, 1921.

Continuation of application No. 327,766. Renewed October 1, 1919. This application filed September 18, 1920. Serial No. 411,169.

*To all whom it may concern:*

Be it known that I, WALTER B. WOORE, a citizen of the United States, and resident of New York city, in the county of New York and State of New York, have invented certain new and useful Improvements in Secondary Valves, of which the following is a specification.

This application is a continuation of application, Serial No. 327,766, renewed October 1, 1919.

This invention relates to secondary valves, and has for its object to provide an improved emergency valve especially designed to be used in connection with faucet fittings or couplings, whereby the water in the pipe leading to the faucet will be automatically cut off when said faucet is taken off for repair or any other purpose. The provision of a secondary valve of this kind will dispense with the necessity of hunting up and turning off a main pipe valve which is often located in an out of the way place in the cellar and is usually very hard to turn on account of infrequent use.

It is the aim of the present invention to provide an emergency valve which may be applied to any form of faucet, cock, union, or pipe coupling, and which is simple in construction, reliable in operation and not dependent upon the action of a spring to cut off the water when the faucet or cock is taken or separated from the coupling. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a longitudinal section through a coupling for a faucet containing my improved valve, part of the faucet being shown in elevation, and the valve being in open position, as when the faucet is fully screwed into place in the coupling;

Fig. 2 is a longitudinal section of the coupling with the valve as it appears when the faucet is removed or unscrewed from the coupling;

Fig. 3 is a detailed elevation of the valve; and

Fig. 4 is an outer end view of the same.

The faucet 1, which as shown in the drawings is typical of any form of faucet or cock, is connected to the coupling 2 by means of the screw-threaded plug 3 which fits into a correspondingly threaded recess in the end of said coupling. The coupling has the usual threaded plug 4 at its other end for connection to a pipe, tank or other fixture as will be readily understood.

Within the coupling an annular valve seat 5 is formed, the same being preferably beveled, as shown, and facing inwardly. The valve 6 is correspondingly shaped and adapted to fit said seat. Projecting outwardly from the valve proper 6 are a plurality of arms 7 preferably arranged equidistant apart and arcuate in cross section so as to form a guide for the valve in the valve seat. The arms are disposed close to the walls of the valve seat to insure a positive seating of the valve onto its seat. Said arms project beyond the inner end of the screw-threaded recess 9 in the coupling in which the plug 3 on the faucet is adapted to fit, so that when said plug is screwed into said recess the inner end of the plug will move the valve inwardly off of its seat leaving a free passage for the water or other fluid to the faucet through the valve.

Projecting from the inner face of the valve is a concentric annular cage 8 which may be perforated, as shown, and which serves to center the pressure of the water on the inner end or face of the valve for insuring its proper and prompt seating upon the seat 5 when the faucet is removed causing the plug 3 to release the valve by moving outward out of the path of the arms 7. When this cage is used as shown, the action of the valve in seating and cutting off the water will be certain without resorting to the employment of any form of spring which would be of little use anyway because it would soon become stiff from infrequent use. The position of the valve when the faucet is removed is illustrated in Fig. 2. A comparison of this figure with Fig. 1 will make it clear that when the plug 3 of the faucet is screwed into the recess 9 of the coupling the inner end of said plug will come into contact with the arms 7 on the outer end of the valve and push said arm and the valve inward, so that by the time the plug is fully screwed in the valve will be held in far enough away from its seat to insure the unrestricted flow of the water through the valve seat to the faucet.

Having thus described my invention, I claim:—

1. The combination with a coupling having an annular valve seat, of a valve to fit said seat, a plurality of spaced arms projecting from the outer face of the valve through the valve seat close to the walls thereof and serving to guide said valve to its seat, a conduit to fit in the outer end of the coupling and engage the arms for moving the valve away from the seat when the conduit is inserted into the coupling, a concentric cage on the inner face of the valve, said cage having perforations in its walls opening on all sides and serving to center the pressure of the water on the valve to insure the proper seating thereof as soon as the conduit is removed from contact with said arms.

2. The combination with a coupling having an annular valve seat, of a valve to fit said seat, a plurality of spaced arms projecting from the outer face of the valve through the valve seat close to the walls thereof and serving to guide said valve to its seat, a conduit to fit in the outer end of the coupling and engage said arms for moving the valve away from the seat when the conduit is inserted into the coupling, and a cage on the inner face of the valve for centering the pressure of the water thereon to insure the seating of the valve as soon as the faucet is removed.

3. A coupling constituting an article of manufacture provided with a valve seat, a single valvular structure including a valve normally closed onto said seat by the pressure of the fluid in the coupling, said valve structure provided with guiding means comprising spaced arms extending from the valve through and beyond said seat close to the wall thereof, said guiding means provided with openings therethrough to permit a free flow past the valvular structure when in position with the valve unseated, the portion of the coupling in advance of said seat constituting a recess adapted to receive a conduit-forming-member in position to engage said guiding means and hold the valve in unseated position against the pressure of the fluid acting on the valve, said valve structure provided with a centering cage projecting from the valve on the side thereof opposite the guiding means.

Signed at New York city, in the county of New York and State of New York, this 17th day of September, A. D. 1920.

WALTER B. WOORE.